(12) United States Patent
Tsai

(10) Patent No.: US 12,105,354 B2
(45) Date of Patent: Oct. 1, 2024

(54) OPTICAL IMAGING LENS

(71) Applicant: Calin Technology Co., Ltd., Taichung (TW)

(72) Inventor: Po-Nien Tsai, Pingtung County (TW)

(73) Assignee: CALIN TECHNOLOGY CO., LTD., Taichung (TW)

(*) Notice: Subject to any disclaimer, the term of this patent is extended or adjusted under 35 U.S.C. 154(b) by 493 days.

(21) Appl. No.: 17/565,918

(22) Filed: Dec. 30, 2021

(65) Prior Publication Data

US 2023/0131032 A1 Apr. 27, 2023

(30) Foreign Application Priority Data

Oct. 25, 2021 (TW) ................................. 110139506

(51) Int. Cl.
*G02B 9/62* (2006.01)
*G02B 13/18* (2006.01)

(52) U.S. Cl.
CPC ............... *G02B 9/62* (2013.01); *G02B 13/18* (2013.01)

(58) Field of Classification Search
None
See application file for complete search history.

(56) References Cited

U.S. PATENT DOCUMENTS

| 2005/0174463 A1* | 8/2005 | Ohzawa ................. G02B 13/06 348/335 |
| 2009/0034101 A1* | 2/2009 | Hsu ........................ G02B 13/06 359/793 |
| 2009/0251901 A1* | 10/2009 | Kuo ........................... F21K 9/23 362/294 |
| 2016/0202452 A1* | 7/2016 | Kuo ................... G02B 27/0025 359/708 |
| 2021/0041664 A1* | 2/2021 | Wang ................. G02B 13/0045 |

* cited by examiner

*Primary Examiner* — Robert E. Tallman
(74) *Attorney, Agent, or Firm* — Birch, Stewart, Kolasch & Birch, LLP

(57) ABSTRACT

An optical imaging lens, in order from an object side to an image side along an optical axis, includes a first optical assembly, a second optical assembly, a third optical assembly, an aperture, a fourth optical assembly, and a fifth optical assembly, wherein one of the first optical assembly, the second optical assembly, the third optical assembly, the fourth optical assembly, and the fifth optical assembly is a compound lens formed by adhering at least two lenses, while the others are single lenses. The optical imaging lens satisfies 0.07>f56/F>0.015 in both visible spectrum and infrared spectrum, wherein F is a focal length of the optical imaging lens, and f56 is a focal length of the fifth optical assembly, thereby achieving the effect of high image quality and low distortion.

21 Claims, 12 Drawing Sheets

OPTICAL IMAGING LENS

BACKGROUND OF THE INVENTION

Technical Field

The present invention generally relates to an optical image capturing system, and more particularly to an optical imaging lens, which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality and low distortion.

The present invention provides an optical imaging lens, in order from an object side to an image side along an optical axis, including a first optical assembly having negative refractive power, a second optical assembly having negative refractive power, a third optical assembly having positive refractive power, an aperture, a fourth optical assembly having positive refractive power, and a fifth optical assembly having positive refractive power, wherein one of the first optical assembly, the second optical assembly, the third optical assembly, the fourth optical assembly, and the fifth optical assembly include a compound lens formed by adhering at least two lenses, while the others are single lens. The optical imaging lens satisfies: 0.07>f56/F>0.015 in both visible spectrum and infrared spectrum, wherein F is a focal length of the optical imaging lens, and f56 is a focal length of the fifth optical assembly. A wavelength of the visible spectrum ranges between 400 nm and 650 nm, and a wavelength of the infrared spectrum ranges between 760 nm and 1 mm.

The present invention further provides an optical imaging lens, in order from an object side to an image side along an optical axis, includes a first lens having negative refractive power, a second lens having negative refractive power, a third lens having positive refractive power, an aperture, a fourth lens having positive refractive power, a fifth lens having positive refractive power, and a sixth lens having negative refractive power. An object-side surface of the first lens is a convex surface, and an image-side surface of the first lens is a concave surface. An object-side surface of the second lens is a convex surface, and an image-side surface of the second lens is a concave surface. An object-side surface of the third lens is a concave surface, and an image-side surface of the third lens is a convex surface. The object-side surface of the third lens and/or the image-side surface of the third lens are/is an aspheric surface. The fourth lens is a biconvex lens, wherein an object-side surface of the fourth lens and/or an image-side surface of the fourth lens are/is an aspheric surface. The fifth lens is a biconvex lens. An object-side surface of the sixth lens is a concave surface. The object-side surface of the sixth lens and an image-side surface of the fifth lens are adhered to form a compound lens with positive refractive power. The optical imaging lens satisfies: 0.07>f56/F>0.015 in both visible spectrum and infrared spectrum, wherein F is a focal length of the optical imaging lens, and f56 is a focal length of the fifth optical assembly. A wavelength of the visible spectrum ranges between 400 nm and 650 nm, and a wavelength of the infrared spectrum ranges between 760 nm and 1 mm.

With the aforementioned design, the optical imaging lens includes one compound lenses formed by adhering at least two of the lenses, and the fifth optical assembly could generate an effective focal length in both visible spectrum and infrared spectrum, which could effectively improve a chromatic aberration of the optical imaging lens. In addition, the arrangement of the refractive powers and the conditions of the optical imaging lens of the present invention could achieve the effect of high image quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
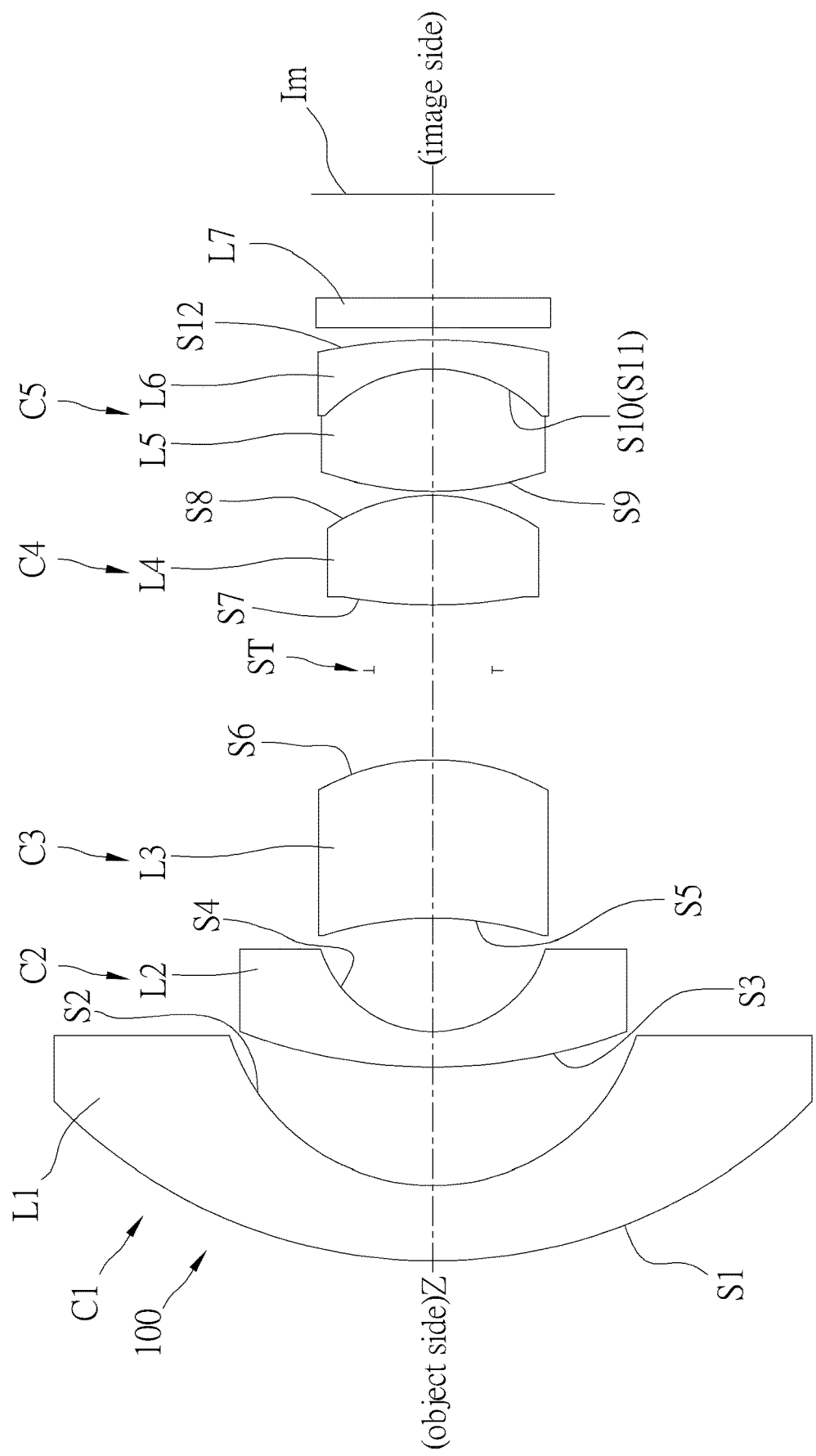
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first optical assembly C1, a second optical assembly C2, a third optical assembly C3, an aperture ST, a fourth optical assembly C4, and a fifth optical assembly C5, wherein one of the first optical assembly, the second optical assembly, the third optical assembly, the fourth optical assembly, and the fifth optical assembly includes a compound lens with at least two lenses that are adhered, while the others are single lenses.

The term "visible spectrum" in the present invention refers to the wavelength range of 400 nm to 650 nm, and "infrared spectrum" in the present invention refers to the wavelength range of 760 nm to 1 mm. The terms herein are only used to explain and understand the present invention, and are not intended to limit the present invention.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface toward the object side, and an image-side surface S2 of the first lens L1 is a concave surface toward the image side. As shown in FIG. 1A, a part of a surface of the first lens L1 toward the image side is recessed to form the image-side surface S2, and the optical axis Z passes through the object-side surface S1 and the image-side surface S2 of the first lens L1.

The second optical assembly C2 has negative refractive power. In the current embodiment, the second optical assembly C2 is a single lens that includes a second lens L2, wherein the second lens L2 is a negative meniscus; an object-side surface S3 of the second lens L2 is a convex surface toward the object side, and an image-side surface S4 of the second lens L2 is a concave surface toward the image side. As shown in FIG. 1A, a part of a surface of the second lens L2 toward the image side is recessed to form the image-side surface S4, and the optical axis Z passes through the object-side surface S3 and the image-side surface S4 of the second lens L2.

The third optical assembly C3 has positive refractive power. In the current embodiment, the third optical assembly C3 is a single lens that includes a third lens L3, wherein the third lens L3 is a negative meniscus; an object-side surface S5 of the third lens L3 is a concave surface toward the object side, and an image-side surface S6 of the third lens L3 is a convex surface toward the image side; the object-side surface S5, the image-side surface S6, or both of the object-side surface S5 and the image-side surface S6 of the third lens L3 are aspheric surfaces. As shown in FIG. 1A, both of the object-side surface S5 and the image-side surface S6 of the third lens L3 are aspheric surfaces.

The fourth optical assembly C4 has positive refractive power. In the current embodiment, the fourth optical assembly C4 is a single lens that includes a fourth lens L4, wherein the fourth lens L4 is a biconvex lens (i.e., both of an object-side surface S7 of the fourth lens L4 and an image-side surface S8 of the fourth lens L4 are convex surfaces); the object-side surface S7, the image-side surface S8, or both of the object-side surface S7 and the image-side surface S8 of the fourth lens L4 are aspheric surfaces. As shown in FIG. 1A, both of the object-side surface S7 and the image-side surface S8 of the fourth lens L4 are aspheric surfaces.

The fifth optical assembly C5 has positive refractive power. In the current embodiment, the fifth optical assembly C5 is a compound lens formed by adhering a fifth lens L5 and a sixth lens L6, wherein the fifth lens L5 is a biconvex lens (i.e., both of an object-side surface S9 of the fifth lens L5 and an image-side surface S10 of the fifth lens L5 are convex surfaces) with positive refractive power; the sixth lens L6 has negative refractive power and is a negative meniscus; an object-side surface S11 of the sixth lens L6 is a concave surface toward the object side, and an image-side surface S12 of the sixth lens L6 is a convex surface toward the image side. As shown in FIG. 1A, the object-side surface S11 of the sixth lens L6 and the image-side surface S10 of the fifth lens L5 are adhered to form a same surface.

Additionally, the optical imaging lens 100 further includes an infrared filter L7 disposed between the sixth lens L6 and an image plane Im of the optical imaging lens 100 and is closer to the image-side surface S12 of the sixth lens L6 than the image plane Im, thereby filtering out excess infrared rays in an image light passing through the optical imaging lens 100 to improve imaging quality.

In order to keep the optical imaging lens 100 in good optical performance and high imaging quality, the optical imaging lens 100 further satisfies:

(1) when the first lens L1 of the first optical assembly C1 is in a standard temperature SD and visible spectrum, the optical imaging lens 100 satisfies: 30° C.>SD>20° C. and −0.1>f1/F>−0.2, wherein F is a focal length of the optical imaging lens 100, and f1 is a focal length of the first lens L1;

(2) when the second lens L2 of the second optical assembly C2 is in the standard temperature SD and visible spectrum, the optical imaging lens 100 satisfies: −0.2>f2/F>−0.4 and 30° C.>SD>20° C., wherein F is the focal length of the optical imaging lens 100, and f2 is a focal length of the second lens L2;

(3) when the third lens L3 of the third optical assembly C3 is in the standard temperature SD and visible spectrum, the optical imaging lens 100 satisfies: 0.16>f3/F>0.1 and 30° C.>SD>20° C., wherein F is the focal length of the optical imaging lens 100, and f3 is a focal length of the third lens L3;

(4) when the third lens L3 of the third optical assembly C3 is in a first working temperature WT1 and visible spectrum, the optical imaging lens 100 satisfies: 0.16>f3/F>0.1, SD>WT1, and 20° C.>WT1>−40° C., wherein F is the focal length of the optical imaging lens 100, and f3 is the focal length of the third lens L3;

(5) when the third lens L3 of the third optical assembly C3 is in a second working temperature WT2 and visible spectrum, the optical imaging lens 100 satisfies: 0.18>f3/F>0.1, WT2>SD, and 105° C.>WT2>30° C., wherein F is the focal length of the optical imaging lens 100, and f3 is the focal length of the third lens L3;

(6) when the fourth lens L4 of the fourth optical assembly C4 is in the standard temperature SD and visible spectrum, the optical imaging lens 100 satisfies: 0.26>f4/F>0.23 and 30° C.>SD>20° C., wherein F is the focal length of the optical imaging lens 100, and f4 is a focal length of the fourth lens L4;

(7) when the fourth lens L4 of the fourth optical assembly C4 is in the first working temperature WT1 and visible spectrum, the optical imaging lens 100 satisfies: 0.26>f4/F>0.23, SD>WT1, and 20° C.>WT1>−40° C., wherein F is the focal length of the optical imaging lens 100, and f4 is the focal length of the fourth lens L4;

(8) when the fourth lens L4 of the fourth optical assembly C4 is in the second working temperature WT2 and visible spectrum, the optical imaging lens 100 satisfies: 0.29>f4/F>0.24, WT2>SD, and 105° C.>WT2>30° C., wherein F is the focal length of the optical imaging lens 100, and f4 is the focal length of the fourth lens L4;

(9) when in visible spectrum or infrared spectrum, the fifth optical assembly C5 of the optical imaging lens 100 satisfies: 0.07>f56/F>0.015, wherein F is the focal length of the optical imaging lens 100, and f56 is a focal length of the compound lens formed by adhering the fifth lens L5 and the sixth lens L6.

Parameters of the optical imaging lens 100 of the first embodiment of the present invention are listed in following Table 1 and Table 2, including the focal length F of the optical imaging lens 100 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens in different temperatures, and the focal length (cemented focal length) of the fifth optical assembly C5 in visible spectrum and infrared spectrum, wherein a unit of the focal length, the radius of curvature, and the distance is millimeter (mm).

degrees, wherein f1=−11.04 mm in the first working temperature WT1; f1=−11.11 mm in the standard temperature SD; f1=−11.12 mm in the second working temperature WT2; f2=−4.68 mm in the first working temperature WT1; f2=−4.71 mm in the standard temperature SD; f2=−4.71 mm in the second working temperature WT2; f3=11.28 mm in the first working temperature WT1; f3=11.35 mm in the standard temperature SD; f3=11.36 mm in the second working temperature WT2; f4=6.97 mm in the first working temperature WT1; f4=7.01 mm in the standard temperature SD; f4=7.01 mm in the second working temperature WT2; f5 (a focal length of the fifth lens L5)=14.82 mm in the first working temperature WT1; f5=14.91 mm in the standard temperature SD; f5=14.92 mm in the second working temperature WT2; f6 (a focal length of the sixth lens L6)=−31.57 mm in the first working temperature WT1; f6=−31.76 mm in the standard temperature SD; f6=−31.78 mm in the second working temperature WT2; f56=26.36 mm in visible spectrum; f56=26.47 mm in infrared spectrum.

Additionally, based on the above detailed parameters, detailed values of the aforementioned conditional formula in the first embodiment are as follows:

(1) when the first lens L1 of the first optical assembly C1 is in the standard temperature SD and visible spectrum, the optical imaging lens 100 satisfies: f1/F=−0.15;

(2) when the second lens L2 of the second optical assembly C2 is in the standard temperature SD and visible spectrum, the optical imaging lens 100 satisfies: f2/F=−0.36;

(3) when the third lens L3 of the third optical assembly C3 is in the standard temperature SD and visible spectrum, the optical imaging lens 100 satisfies: f3/F=0.15;

TABLE 1

F = 1.708 mm; Fno = 2; HFOV = 200 deg

| Surface | R(mm) | D(mm) | Nd | Focal length in First working temperature | Focal length in Standard temperature | Focal length in Second working temperature | Note |
|---|---|---|---|---|---|---|---|
| S1 | 14.62 | 1.78 | 1.88 | −11.04 | −11.11 | −11.12 | L1 |
| S2 | 6.37 | 2.82 | 1 | 0 | 0 | 0 | |
| S3 | 13.41 | 0.79 | 1.82 | −4.68 | −4.71 | −4.71 | L2 |
| S4 | 1.97 | 2.73 | 1 | 0 | 0 | 0 | |
| S5 | −10.9 | 3.76 | 1.85 | 11.28 | 11.35 | 11.36 | L3 |
| S6 | −5.77 | 2.12 | 1 | 0 | 0 | 0 | |
| ST | Infinity | 1.54 | 1 | 0 | 0 | 0 | ST |
| S7 | 9.63 | 2.62 | 1.5 | 6.97 | 7.01 | 7.01 | L4 |
| S8 | −3.78 | 0.1 | 1 | 0 | 0 | 0 | |
| S9 | 8.91 | 2.9 | 1.6 | 14.82 | 14.91 | 14.92 | L5 |
| S10, S11 | −4.78 | 0.67 | 1.96 | −31.57 | −31.76 | −31.78 | L6 |
| S12 | −15.79 | 0.3 | 1 | 0 | 0 | 0 | |
| S13 | Infinity | 0.7 | 1.52 | 0 | 0 | 0 | Infrared filter L7 |
| S14 | Infinity | 2.47 | 1 | 0 | 0 | 0 | |
| Im | Infinity | | | | | | Image plane Im |

TABLE 2

| Surface | Cemented focal length in visible spectrum | Cemented focal length in infrared spectrum | Note |
|---|---|---|---|
| S 9 | 26.36 | 26.47 | C5 |

It can be seen from Table 1 and Table 2 that, in the current embodiment, the focal length F of the optical imaging lens 100 is 1.708 mm, and the Fno is 2, and the HFOV is 200

(4) when the third lens L3 of the third optical assembly C3 is in the first working temperature WT1 and visible spectrum, the optical imaging lens 100 satisfies: f3/F=0.15;

(5) when the third lens L3 of the third optical assembly C3 is in a second working temperature WT2 and visible spectrum, the optical imaging lens 100 satisfies: f3/F=0.17;

(6) when the fourth lens L4 of the fourth optical assembly C4 is in the standard temperature SD and visible spectrum, the optical imaging lens 100 satisfies: f4/F=0.24;

(7) when the fourth lens L4 of the fourth optical assembly C4 is in the first working temperature WT1 and visible spectrum, the optical imaging lens 100 satisfies: f4/F=0.25;

(8) when the fourth lens L4 of the fourth optical assembly C4 is in the second working temperature WT2 and visible spectrum, the optical imaging lens 100 satisfies: f4/F=0.27;

(9) when in visible spectrum or infrared spectrum, the fifth optical assembly C5 of the optical imaging lens 100 satisfies: f56/F=0.06.

With the aforementioned design, the first optical assembly C1 to the fifth optical assembly C5 satisfy the aforementioned conditions (1) to (9) of the optical imaging lens 100.

Moreover, an aspheric surface contour shape Z of each of the object-side surface S5 of the third lens L3, and the image-side surface S6 of the third lens L3, and the object-side surface S7 of the fourth lens L4, and the image-side surface S8 of the fourth lens L4 of the optical imaging lens 100 according to the first embodiment could be obtained by following formula:

$$Z = \frac{ch^2}{1+\sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S5 of the third lens L3, and the image-side surface S6 of the third lens L3, and the object-side surface S7 of the fourth lens L4, and the image-side surface S8 of the fourth lens L4 of the optical imaging lens 100 according to the first embodiment and the different order coefficient of A2, A4, A6, A8, A10, A12, A14, and A16 are listed in following Table 3:

TABLE 3

| Surface | S5 | S6 | S7 | S8 |
|---|---|---|---|---|
| k | 6.82E+00 | −2.23E−01 | −1.94E+01 | −2.59E−01 |
| A2 | 0 | 0 | 0 | 0 |
| A4 | 6.93E−04 | 1.23E−03 | 2.17E−04 | −5.03E−04 |
| A6 | 1.15E−05 | −1.63E−04 | 0 | 9.16E−05 |
| A8 | −6.70E−06 | 8.77E−06 | 0 | −1.79E−05 |
| A10 | 1.36E−06 | −3.10E−07 | 0 | 8.63E−07 |
| A12 | −1.52E−07 | −3.06E−25 | 0 | 0 |
| A14 | 5.71E−09 | 0 | 0 | 0 |
| A16 | 0 | 0 | 0 | 0 |

Figure 1B:
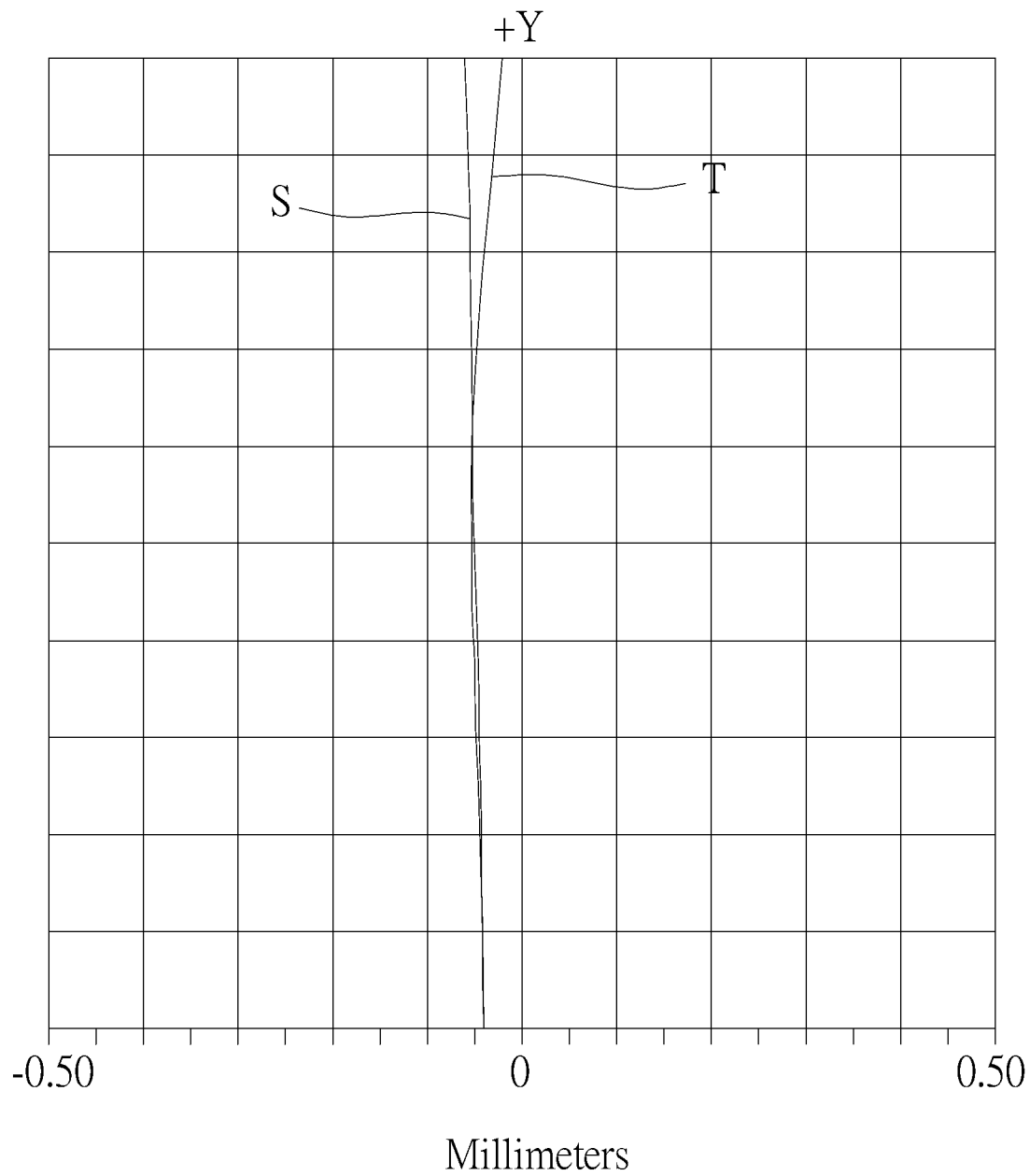
FIG. 1B is a diagram showing the astigmatic field curvature of the optical imaging lens according to the first embodiment of the present invention.
Figure 1C:
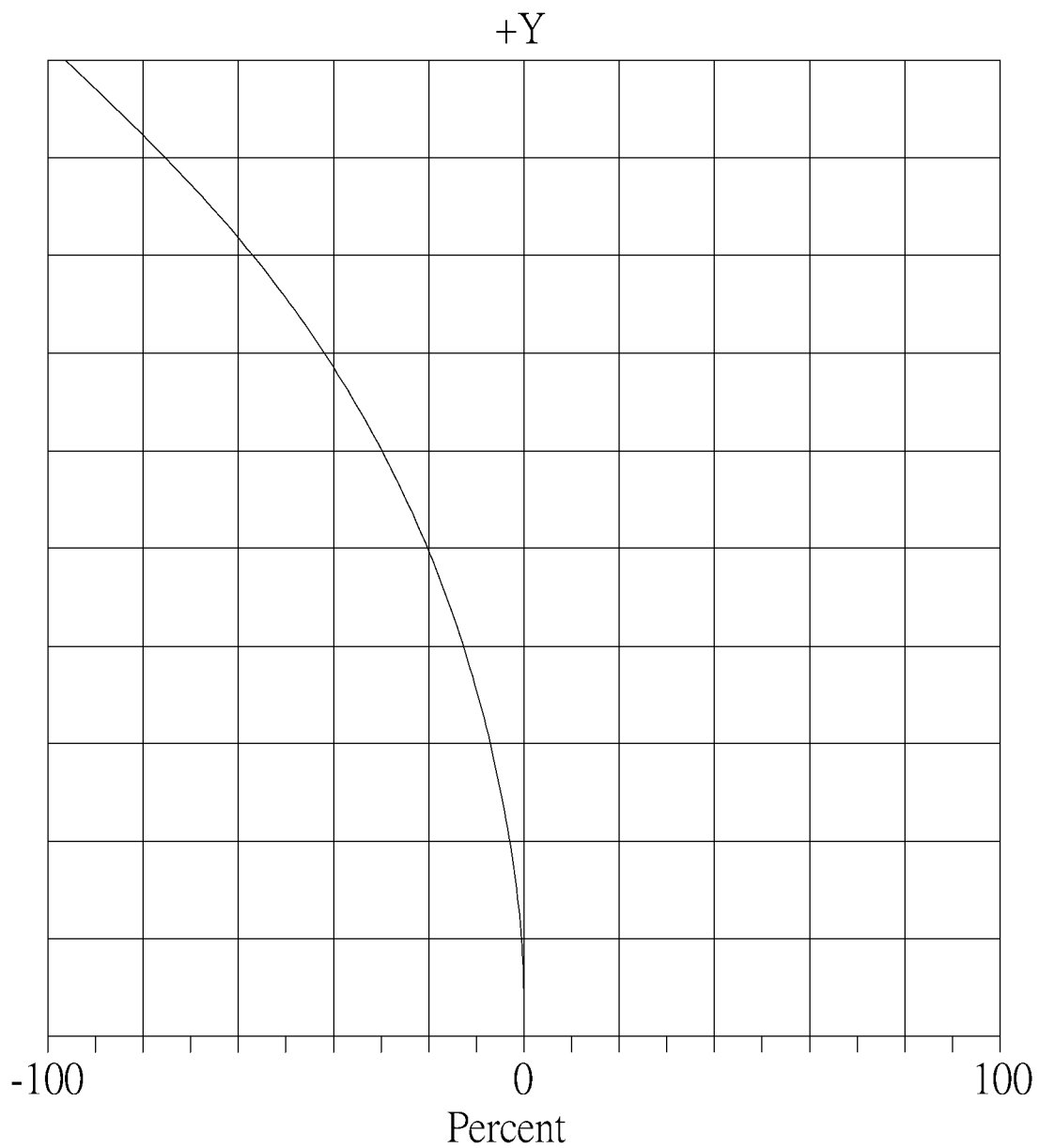
FIG. 1C is a diagram showing the distortion of the optical imaging lens according to the first embodiment of the present invention.
Figure 1D:
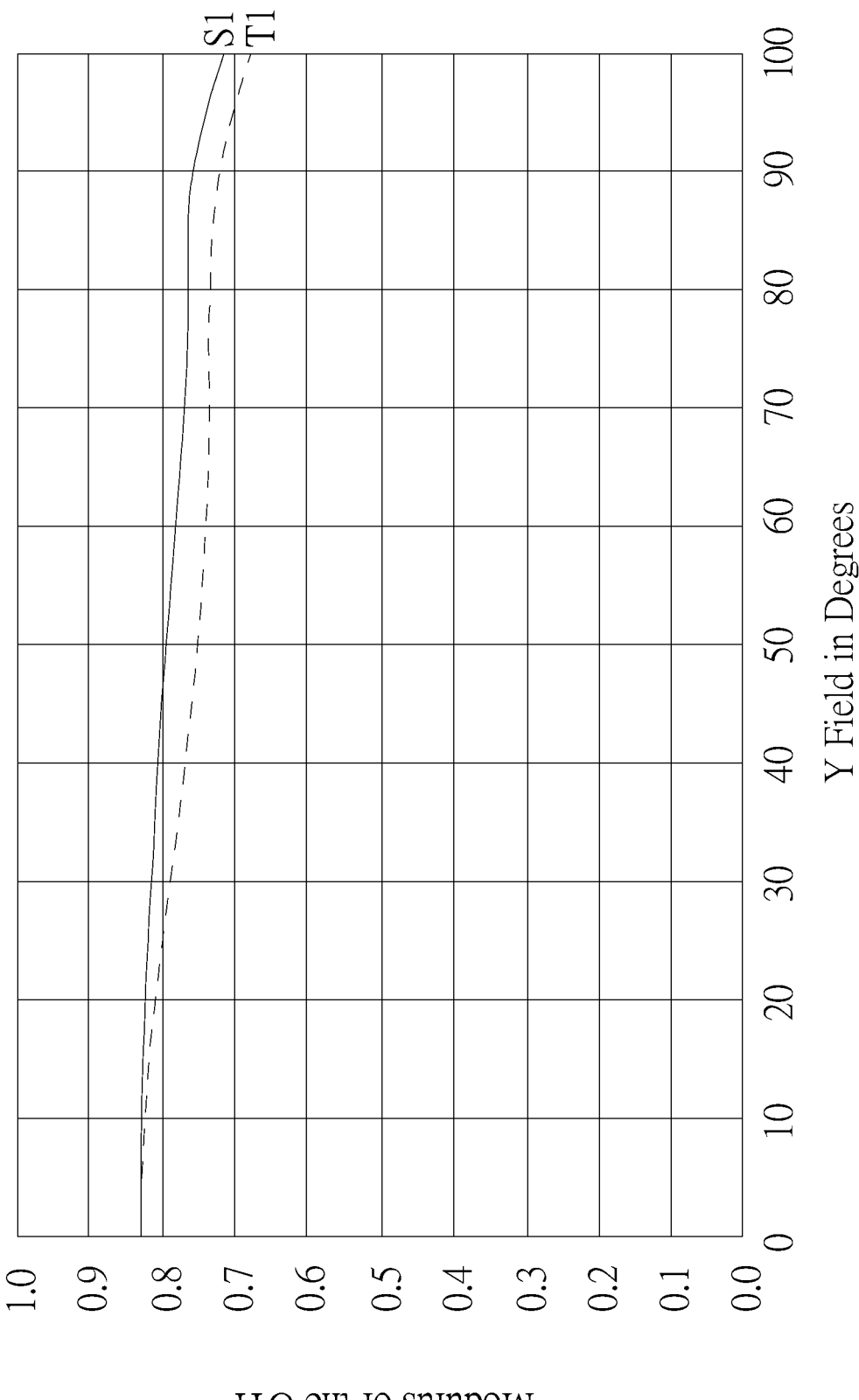
FIG. 1D is a diagram showing the modulus of the OTF of the optical imaging lens according to the first embodiment of the present invention.

Taking optical simulation data to verify the imaging quality of the optical imaging lens 100, wherein FIG. 1B is a diagram showing the astigmatic field curves according to the first embodiment; FIG. 1C is a diagram showing the distortion according to the first embodiment; FIG. 1D is a diagram showing the modulus of the OTF according to the first embodiment. In FIG. 1B, a curve S is data of a sagittal direction, and a curve T is data of a tangential direction. The graphics shown in FIG. 1C and FIG. 1D are within a standard range. In this way, the optical imaging lens 100 of the first embodiment could effectively enhance image quality and lower a distortion thereof.

Figure 2A:
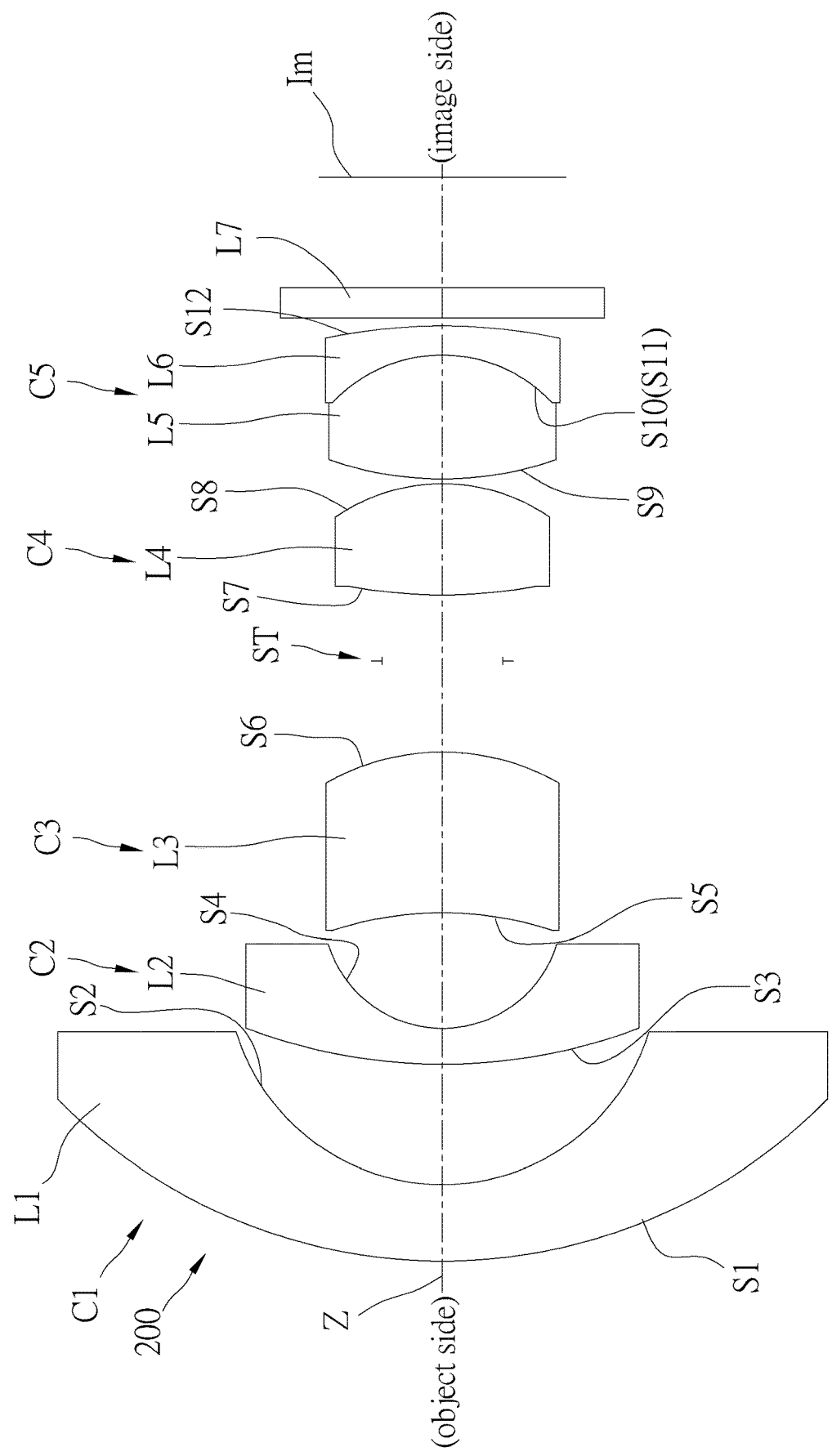
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first optical assembly C1, a second optical assembly C2, a third optical assembly C3, an aperture ST, a fourth optical assembly C4, and a fifth optical assembly C5.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface that is convex toward the object side, and an image-side surface S2 of the first lens L1 is a concave surface toward the image side. As shown in FIG. 2A, a part of a surface of the first lens L1 toward the image side is recessed to form the image-side surface S2, and the optical axis Z passes through the object-side surface S1 and the image-side surface S2 of the first lens L1.

The second optical assembly C2 has negative refractive power. In the current embodiment, the second optical assembly C2 is a single lens that includes a second lens L2, wherein the second lens L2 is a negative meniscus; an object-side surface S3 of the second lens L2 is a convex surface toward the object side, and an image-side surface S4 of the second lens L2 is a concave surface toward the image side. As shown in FIG. 2A, a part of a surface of the second lens L2 toward the image side is recessed to form the image-side surface S4, and the optical axis Z passes through the object-side surface S3 and the image-side surface S4 of the second lens L2.

The third optical assembly C3 has positive refractive power. In the current embodiment, the third optical assembly C3 is a single lens that includes a third lens L3, wherein the third lens L3 is a negative meniscus; an object-side surface S5 of the third lens L3 is a concave surface toward the object side, and an image-side surface S6 of the third lens L3 is a convex surface toward the image side; the object-side surface S5, the image-side surface S6, or both of the object-side surface S5 and the image-side surface S6 of the third lens L3 are aspheric surfaces. As shown in FIG. 2A, both of the object-side surface S5 and the image-side surface S6 of the third lens L3 are aspheric surfaces.

The fourth optical assembly C4 has positive refractive power. In the current embodiment, the fourth optical assembly C4 is a single lens that includes a fourth lens L4, wherein the fourth lens L4 is a biconvex lens (i.e., both of an object-side surface S7 of the fourth lens L4 and an image-side surface S8 of the fourth lens L4 are convex surfaces); the object-side surface S7, the image-side surface S8, or both of the object-side surface S7 and the image-side surface S8 of the fourth lens L4 are aspheric surfaces. As shown in FIG. 2A, both of the object-side surface S7 and the image-side surface S8 of the fourth lens L4 are aspheric surfaces.

The fifth optical assembly C5 has positive refractive power. In the current embodiment, the fifth optical assembly C5 is a compound lens formed by adhering a fifth lens L5 and a sixth lens L6, wherein the fifth lens L5 is a biconvex lens (i.e., both of an object-side surface S9 of the fifth lens L5 and an image-side surface S10 of the fifth lens L5 are convex surfaces) with positive refractive power. The sixth lens L6 has negative refractive power and is a negative meniscus; an object-side surface S11 of the sixth lens L6 is a concave surface toward the object side, and an image-side surface S12 of the sixth lens L6 is a convex surface toward the image side. As shown in FIG. 2A, the object-side surface S11 of the sixth lens L6 and the image-side surface S10 of the fifth lens L5 are adhered to form a same surface.

Additionally, the optical imaging lens 200 further includes an infrared filter L7 disposed between the sixth lens L6 and an image plane Im of the optical imaging lens 200 and is closer to the image-side surface S12 of the sixth lens L6 than the image plane Im, thereby filtering out excess infrared rays in an image light passing through the optical imaging lens 200 to improve imaging quality.

In order to keep the optical imaging lens 200 in good optical performance and high imaging quality, the optical imaging lens 200 further satisfies:

(1) when the first lens L1 of the first optical assembly C1 is in a standard temperature SD and visible spectrum, the optical imaging lens 200 satisfies: 30° C.>SD>20° C. and −0.1>f1/F>−0.2, wherein F is a focal length of the optical imaging lens 200, and f1 is a focal length of the first lens L1;

(2) when the second lens L2 of the second optical assembly C2 is in the standard temperature SD and visible spectrum, the optical imaging lens 200 satisfies: −0.2>f2/F>−0.4 and 30° C.>SD>20° C., wherein F is the focal length of the optical imaging lens 200, and f2 is a focal length of the second lens L2;

(3) when the third lens L3 of the third optical assembly C3 is in the standard temperature SD and visible spectrum, the optical imaging lens 200 satisfies: 0.16>f3/F>0.1 and 30° C.>SD>20° C., wherein F is the focal length of the optical imaging lens 200, and f3 is a focal length of the third lens L3;

(4) when the third lens L3 of the third optical assembly C3 is in a first working temperature WT1 and visible spectrum, the optical imaging lens 200 satisfies: 0.16>f3/F>0.1, SD>WT1, and 20° C.>WT1>−40° C., wherein F is the focal length of the optical imaging lens 200, and f3 is the focal length of the third lens L3;

(5) when the third lens L3 of the third optical assembly C3 is in a second working temperature WT2 and visible spectrum, the optical imaging lens 200 satisfies: 0.18>f3/F>0.1, WT2>SD, and 105° C.>WT2>30° C., wherein F is the focal length of the optical imaging lens 200, and f3 is the focal length of the third lens L3;

(6) when the fourth lens L4 of the fourth optical assembly C4 is in the standard temperature SD and visible spectrum, the optical imaging lens 200 satisfies: 0.26>f4/F>0.23 and 30° C.>SD>20° C., wherein F is the focal length of the optical imaging lens 200, and f4 is a focal length of the fourth lens L4;

(7) when the fourth lens L4 of the fourth optical assembly C4 is in the first working temperature WT1 and visible spectrum, the optical imaging lens 200 satisfies: 0.26>f4/F>0.23, SD>WT1, and 20° C.>WT1>−40° C., wherein F is the focal length of the optical imaging lens 200, and f4 is the focal length of the fourth lens L4;

(8) when the fourth lens L4 of the fourth optical assembly C4 is in the second working temperature WT2 and visible spectrum, the optical imaging lens 200 satisfies: 0.29>f4/F>0.24, WT2>SD, and 105° C.>WT2>30° C., wherein F is the focal length of the optical imaging lens 200, and f4 is the focal length of the fourth lens L4;

(9) when in visible spectrum or infrared spectrum, the fifth optical assembly C5 of the optical imaging lens 200 satisfies: 0.07>f56/F>0.015, wherein F is the focal length of the optical imaging lens 200, and f56 is a focal length of the compound lens formed by adhering the fifth lens L5 and the sixth lens L6.

Parameters of the optical imaging lens 200 of the second embodiment of the present invention are listed in following Table 4 and Table 5, including the focal length F of the optical imaging lens 200 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens in different temperatures, and the focal length (cemented focal length) of the fifth optical assembly C5 in visible spectrum and infrared spectrum, wherein a unit of the focal length, the radius of curvature, and the distance is millimeter (mm).

TABLE 3

F = 1.55 mm; Fno = 2; HFOV = 200 deg

| Surface | R(mm) | D(mm) | Nd | Focal length in First working temperature | Focal length in Standard temperature | Focal length in Second working temperature | Note |
|---|---|---|---|---|---|---|---|
| S1 | 13.38 | 1.62 | 1.88 | −10.26 | −10.06 | −10.32 | L1 |
| S2 | 4.88 | 2.56 | 1 | 0 | 0 | 0 | |
| S3 | 13.06 | 0.72 | 1.82 | −4.38 | −4.29 | −4.4 | L2 |
| S4 | 2.7 | 2.48 | 1 | 0 | 0 | 0 | |
| S5 | −8 | 3.42 | 1.85 | 10.59 | 10.38 | 10.65 | L3 |
| S6 | −6.26 | 1.93 | 1 | 0 | 0 | 0 | |
| ST | Infinity | 1.4 | 1 | 0 | 0 | 0 | ST |
| S7 | 9.53 | 2.39 | 1.5 | 6.48 | 6.35 | 6.51 | L4 |
| S8 | −5.35 | 0.09 | 1 | 0 | 0 | 0 | |
| S9 | 9.1 | 2.64 | 1.6 | 13.82 | 13.55 | 13.9 | L5 |
| S10, S11 | −4.44 | 0.61 | 1.96 | −28.68 | −28.12 | −28.85 | L6 |
| S12 | −14.61 | 0.18 | 1 | 0 | 0 | 0 | |
| S13 | Infinity | 0.64 | 1.52 | 0 | 0 | 0 | Infrared filter L7 |
| S14 | Infinity | 2.33 | 1 | 0 | 0 | 0 | |
| Im | Infinity | | | | | | Image plane Im |

TABLE 5

| Surface | Cemented focal length in visible spectrum | Cemented focal length in infrared spectrum | Note |
|---|---|---|---|
| S 9 | 24.43 | 25.25 | C5 |

It can be seen from Table 4 and Table 5 that, in the second embodiment, the focal length (F) of the optical imaging lens 200 is 1.55 mm, and the Fno is 2, and the HFOV is 200 degrees, wherein f1=−10.26 mm in the first working temperature WT1; f1=−10.06 mm in the standard temperature SD; f1=−10.32 mm in the second working temperature WT2; f2=−4.38 mm in the first working temperature WT1; f2=−4.29 mm in the standard temperature SD; f2=−4.4 mm in the second working temperature WT2; f3=10.59 mm in the first working temperature WT1; f3=10.38 mm in the standard temperature SD; f3=10.65 mm in the second working temperature WT2; f4=6.48 mm in the first working temperature WT1; f4=6.35 mm in the standard temperature SD; f4=6.51 mm in the second working temperature WT2; f5 (a focal length of the fifth lens L5)=13.82 mm in the first working temperature WT1; f5=13.55 mm in the standard temperature SD; f5=13.9 mm in the second working temperature WT2; f6 (a focal length of the sixth lens L6)=−28.68 mm in the first working temperature WT1; f6=−28.12 mm in the standard temperature SD; f6=−28.85 mm in the second working temperature WT2; f56=24.43 mm in visible spectrum; f56=25.25 mm in infrared spectrum.

Additionally, based on the above detailed parameters, detailed values of the aforementioned conditional formula in the second embodiment are as follows:

(1) when the first lens L1 of the first optical assembly C1 is in the standard temperature SD and visible spectrum, the optical imaging lens 200 satisfies: f1/F=−0.15;

(2) when the second lens L2 of the second optical assembly C2 is in the standard temperature SD and visible spectrum, the optical imaging lens 200 satisfies: f2/F=−0.36;

(3) when the third lens L3 of the third optical assembly C3 is in the standard temperature SD and visible spectrum, the optical imaging lens 200 satisfies: f3/F=0.15;

(4) when the third lens L3 of the third optical assembly C3 is in the first working temperature WT1 and visible spectrum, the optical imaging lens 200 satisfies: f3/F=0.15;

(5) when the third lens L3 of the third optical assembly C3 is in a second working temperature WT2 and visible spectrum, the optical imaging lens 200 satisfies: f3/F=0.16;

(6) when the fourth lens L4 of the fourth optical assembly C4 is in the standard temperature SD and visible spectrum, the optical imaging lens 200 satisfies: f4/F=0.24;

(7) when the fourth lens L4 of the fourth optical assembly C4 is in the first working temperature WT1 and visible spectrum, the optical imaging lens 100 satisfies: f4/F=0.24;

(8) when the fourth lens L4 of the fourth optical assembly C4 is in the second working temperature WT2 and visible spectrum, the optical imaging lens 100 satisfies: f4/F=0.26;

(9) when in visible spectrum or infrared spectrum, the fifth optical assembly C5 of the optical imaging lens 100 satisfies: f56/F=0.06.

With the aforementioned design, the first optical assembly C1 to the fifth optical assembly C5 satisfy the aforementioned conditions (1) to (9) of the optical imaging lens 200.

Moreover, an aspheric surface contour shape Z of each of the object-side surface S5 of the third lens L3, and the image-side surface S6 of the third lens L3, and the object-side surface S7 of the fourth lens L4, and the image-side surface S8 of the fourth lens L4 of the optical imaging lens 200 according to the second embodiment could be obtained by following formula:

$$Z = \frac{ch^2}{1+\sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S5 of the third lens L3, and the image-side surface S6 of the third lens L3, and the object-side surface S7 of the fourth lens L4, and the image-side surface S8 of the fourth lens L4 of the optical imaging lens 200 according to the second embodiment and the different order coefficient of A2, A4, A6, A8, A10, A12, A14, and A16 are listed in following Table 6:

TABLE 6

| Surface | S5 | S6 | S7 | S8 |
|---|---|---|---|---|
| k | 9.84E−01 | −4.55E−01 | −9.75E+00 | −4.98E−01 |
| A2 | 0 | 0 | 0 | 0 |
| A4 | 4.47E−04 | 1.10E−03 | 0 | −1.49E−04 |
| A6 | 7.28E−06 | −6.33E−05 | 0 | 2.22E−05 |
| A8 | −4.06E−06 | 2.29E−06 | 0 | −6.23E−06 |
| A10 | 1.64E−07 | −3.78E−08 | 0 | 2.75E−07 |
| A12 | 0 | 0 | 0 | 1.56E−10 |
| A14 | 0 | 0 | 0 | 0 |
| A16 | 0 | 0 | 0 | 0 |

Figure 2B:
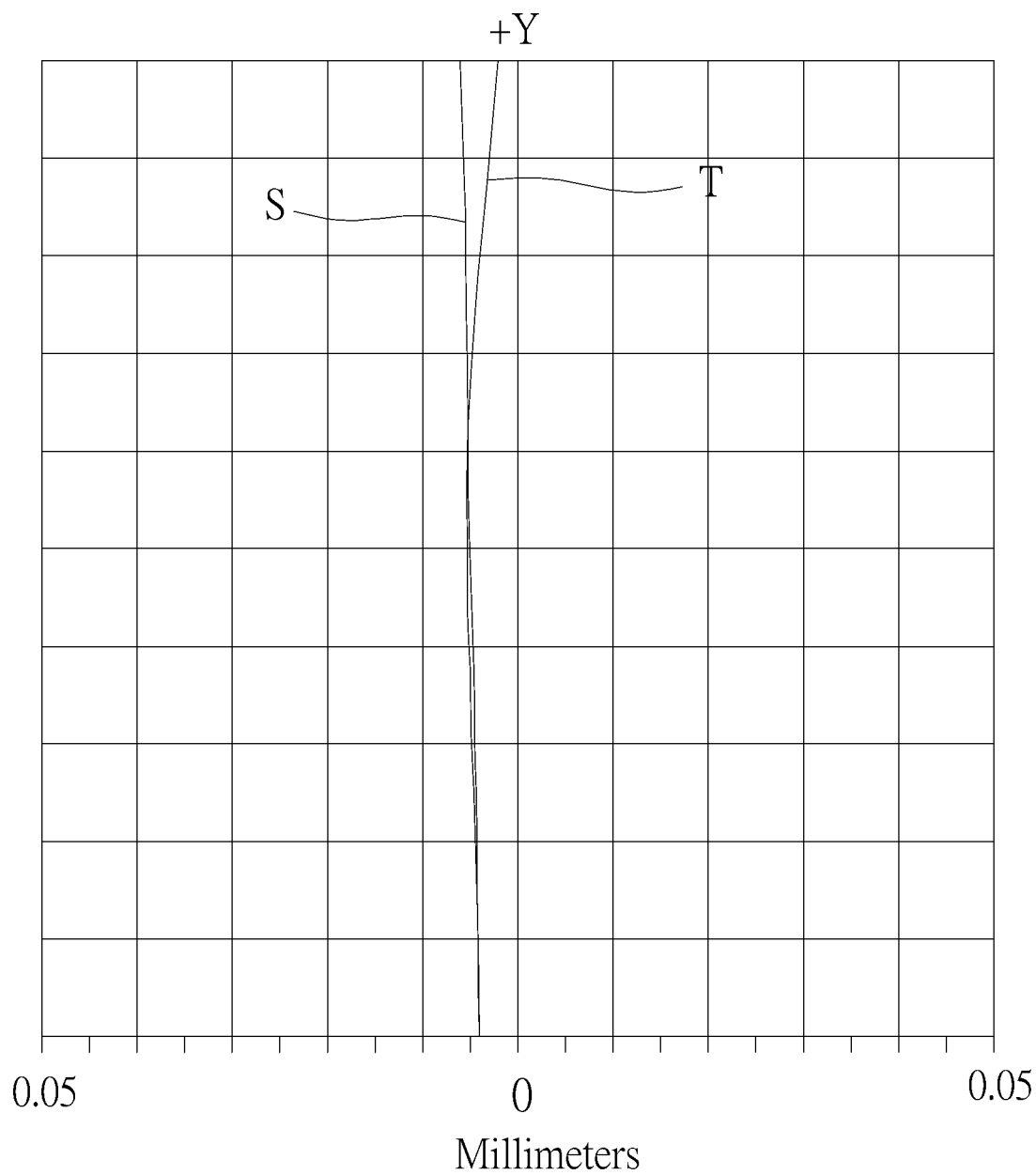
FIG. 2B is a diagram showing the astigmatic field curvature of the optical imaging lens according to the second embodiment of the present invention.
Figure 2C:
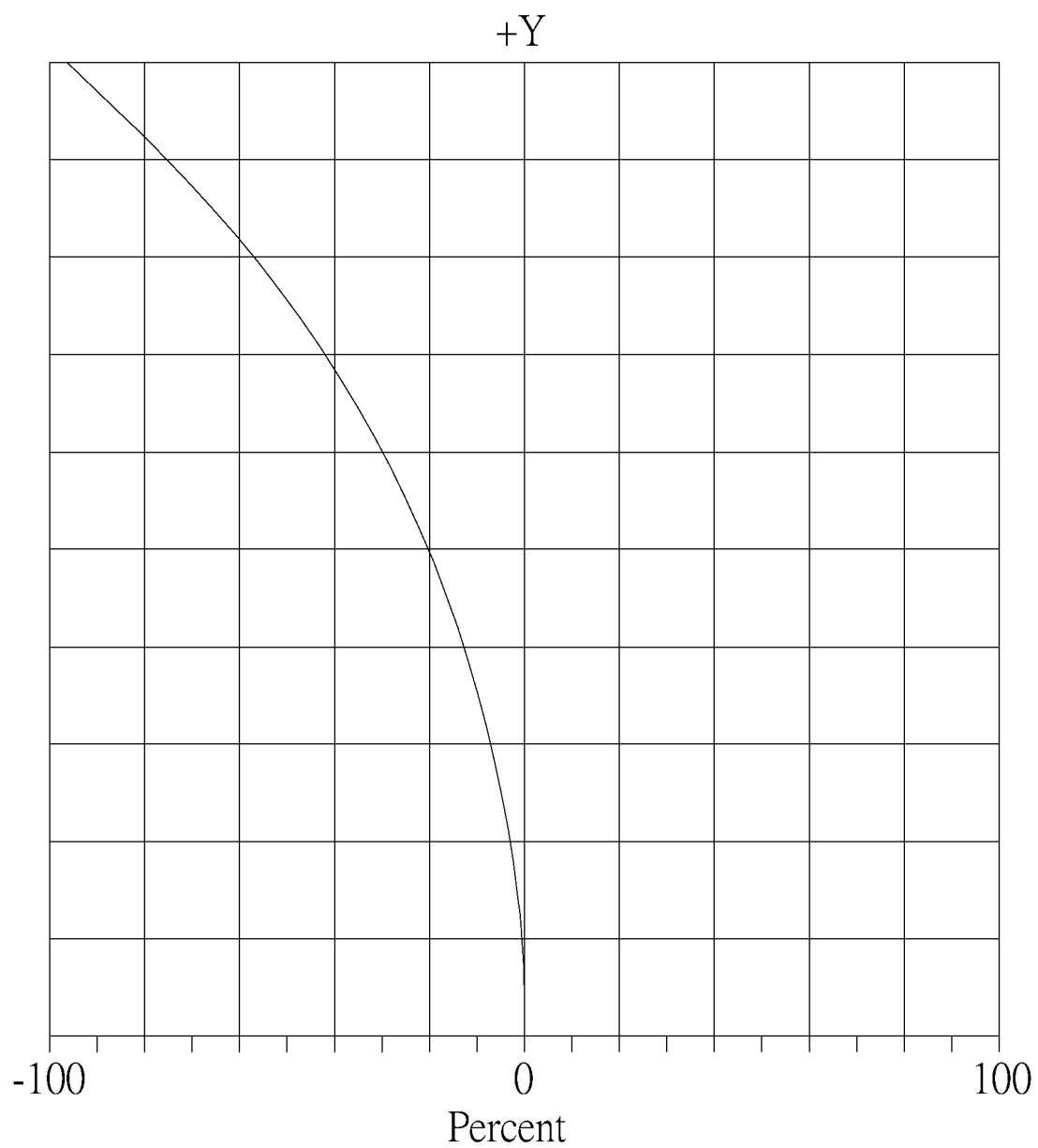
FIG. 2C is a diagram showing the distortion of the optical imaging lens according to the second embodiment of the present invention.
Figure 2D:
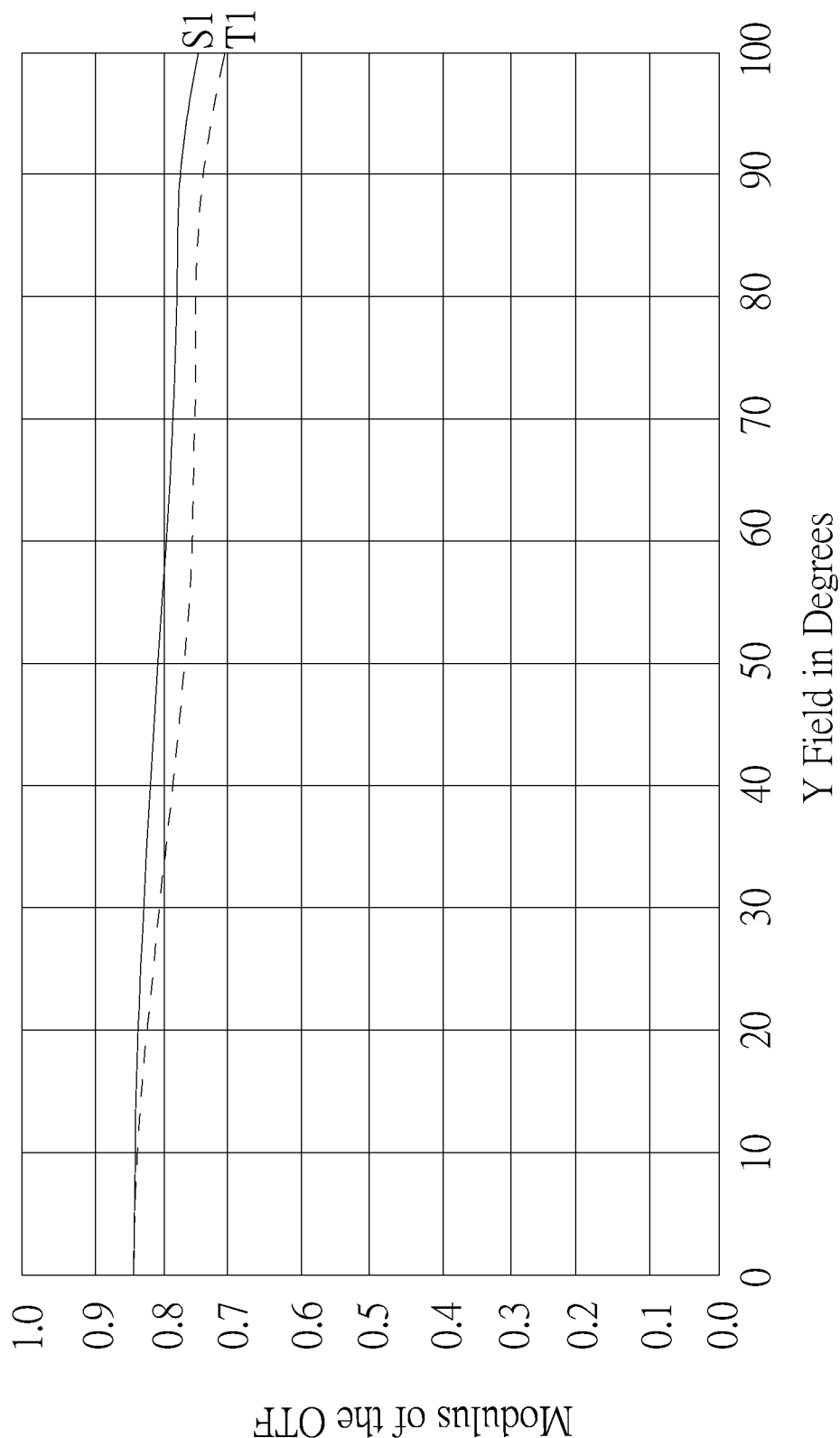
FIG. 2D is a diagram showing the modulus of the OTF of the optical imaging lens according to the second embodiment of the present invention.

Taking optical simulation data to verify the imaging quality of the optical imaging lens 200, wherein FIG. 2B is a diagram showing the astigmatic field curves according to the second embodiment; FIG. 2C is a diagram showing the distortion according to the second embodiment; FIG. 2D is a diagram showing the modulus of the OTF according to the second embodiment. In FIG. 2B, a curve S is data of a sagittal direction, and a curve T is data of a tangential direction. The graphics shown in FIG. 2C and FIG. 2D are within a standard range. In this way, the optical imaging lens 200 of the second embodiment could effectively enhance image quality and lower a distortion thereof.

Figure 3A:
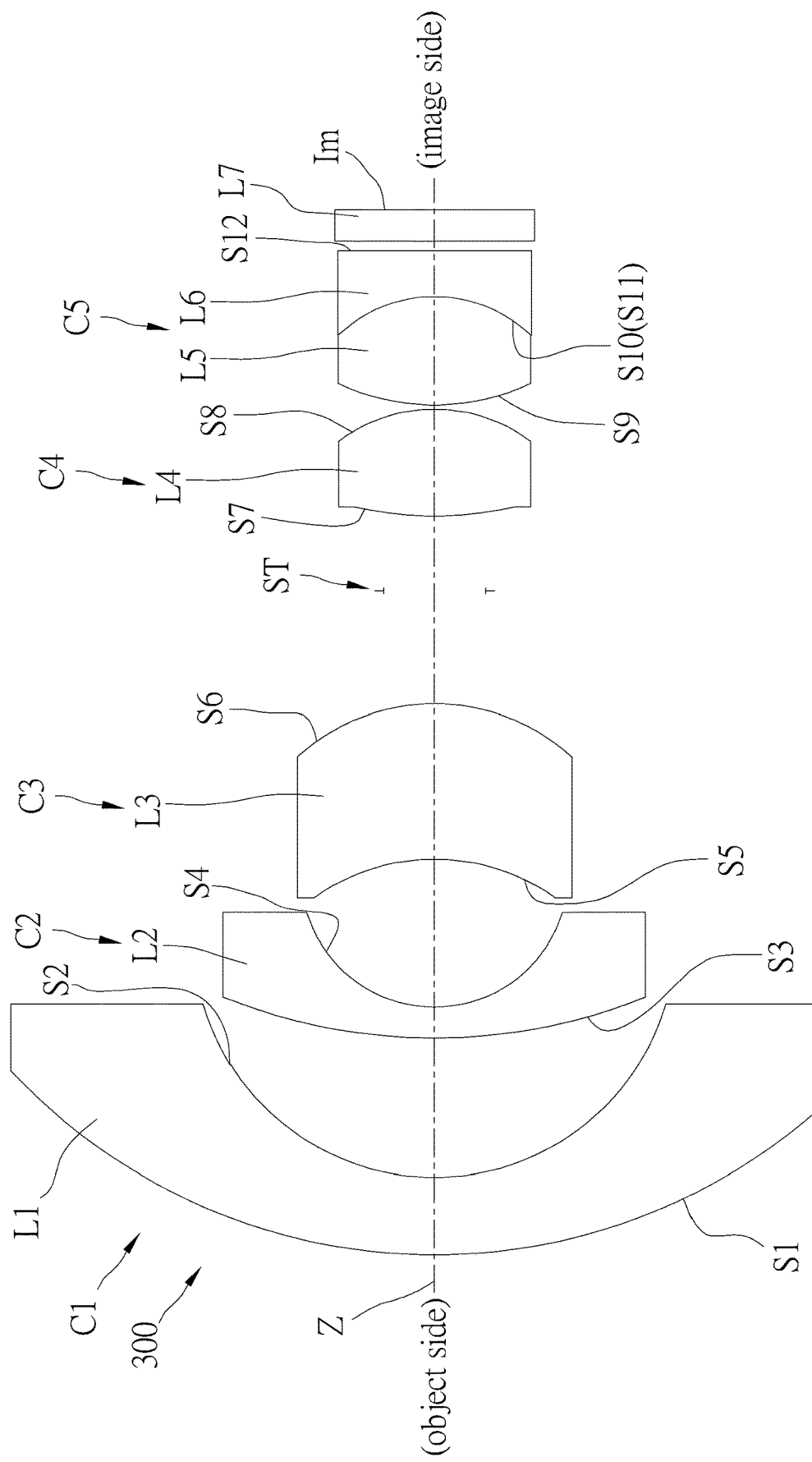
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first optical assembly C1, a second optical assembly C2, a third optical assembly C3, an aperture ST, a fourth optical assembly C4, and a fifth optical assembly C5.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface that is convex toward the object side, and an image-side surface S2 of the first lens L1 is a concave surface toward the image side. As shown in FIG. 3A, a part of a surface of the first lens L1 toward the image side is recessed to form the image-side surface S2, and the optical axis Z passes through the object-side surface S1 and the image-side surface S2 of the first lens L1.

The second optical assembly C2 has negative refractive power. In the current embodiment, the second optical assembly C2 is a single lens that includes a second lens L2, wherein the second lens L2 is a negative meniscus; an object-side surface S3 of the second lens L2 is a convex surface toward the object side, and an image-side surface S4 of the second lens L2 is a concave surface toward the image side. As shown in FIG. 3A, a part of a surface of the second lens L2 toward the image side is recessed to form the image-side surface S4, and the optical axis Z passes through the object-side surface S3 and the image-side surface S4 of the second lens L2.

The third optical assembly C3 has positive refractive power. In the current embodiment, the third optical assembly C3 is a single lens that includes a third lens L3, wherein the third lens L3 is a negative meniscus; an object-side surface S5 of the third lens L3 is a concave surface toward the object side, and an image-side surface S6 of the third lens L3 is a convex surface toward the image side; the object-side surface S5, the image-side surface S6, or both of the object-side surface S5 and the image-side surface S6 of the third lens L3 are aspheric surfaces. As shown in FIG. 3A, both of the object-side surface S5 and the image-side surface S6 of the third lens L3 are aspheric surfaces.

The fourth optical assembly C4 has positive refractive power. In the current embodiment, the fourth optical assembly C4 is a single lens that includes a fourth lens L4, wherein the fourth lens L4 is a biconvex lens (i.e., both of an object-side surface S7 of the fourth lens L4 and an image-side surface S8 of the fourth lens L4 are convex surfaces); the object-side surface S7, the image-side surface S8, or both of the object-side surface S7 and the image-side surface S8 of the fourth lens L4 are aspheric surfaces. As shown in FIG. 3A, both of the object-side surface S7 and the image-side surface S8 of the fourth lens L4 are aspheric surfaces.

The fifth optical assembly C5 has positive refractive power. In the current embodiment, the fifth optical assembly C5 is a compound lens formed by adhering a fifth lens L5 and a sixth lens L6, wherein the fifth lens L5 is a biconvex lens (i.e., both of an object-side surface S9 of the fifth lens L5 and an image-side surface S10 of the fifth lens L5 are convex surfaces) with positive refractive power. The sixth lens L6 has negative refractive power and is a biconcave lens (i.e., both of an object-side surface S11 of the sixth lens L6 and an image-side surface S12 of the sixth lens L6 are concave surfaces). As shown in FIG. 3A, the object-side surface S11 of the sixth lens L6 and the image-side surface S10 of the fifth lens L5 are adhered to form a same surface.

Additionally, the optical imaging lens 300 further includes an infrared filter L7 disposed between the sixth lens L6 and an image plane Im of the optical imaging lens 300, thereby filtering out excess infrared rays in an image light passing through the optical imaging lens 300 to improve imaging quality.

In order to keep the optical imaging lens 300 in good optical performance and high imaging quality, the optical imaging lens 300 further satisfies:

(1) when the first lens L1 of the first optical assembly C1 is in a standard temperature SD and visible spectrum, the optical imaging lens 300 satisfies: 30° C.>SD>20° C. and −0.1>f1/F>−0.2, wherein F is a focal length of the optical imaging lens 300, and f1 is a focal length of the first lens L1;

(2) when the second lens L2 of the second optical assembly C2 is in the standard temperature SD and visible spectrum, the optical imaging lens 300 satisfies: −0.2>f2/F>−0.4 and 30° C.>SD>20° C., wherein F is the focal length of the optical imaging lens 300, and f2 is a focal length of the second lens L2;

(3) when the third lens L3 of the third optical assembly C3 is in the standard temperature SD and visible spectrum, the optical imaging lens 300 satisfies: 0.16>f3/F>0.1 and 30° C.>SD>20° C., wherein F is the focal length of the optical imaging lens 300, and f3 is a focal length of the third lens L3;

(4) when the third lens L3 of the third optical assembly C3 is in a first working temperature WT1 and visible spectrum, the optical imaging lens 300 satisfies: 0.16>f3/F>0.1, SD>WT1, and 20° C.>WT1>−40° C., wherein F is the focal length of the optical imaging lens 300, and f3 is the focal length of the third lens L3;

(5) when the third lens L3 of the third optical assembly C3 is in a second working temperature WT2 and visible spectrum, the optical imaging lens 300 satisfies: 0.18>f3/F>0.1, WT2>SD, and 105° C.>WT2>30° C., wherein F is the focal length of the optical imaging lens 300, and f3 is the focal length of the third lens L3;

(6) when the fourth lens L4 of the fourth optical assembly C4 is in the standard temperature SD and visible spectrum, the optical imaging lens 300 satisfies: 0.26>f4/F>0.23 and 30° C.>SD>20° C., wherein F is the focal length of the optical imaging lens 300, and f4 is a focal length of the fourth lens L4;

(7) when the fourth lens L4 of the fourth optical assembly C4 is in the first working temperature WT1 and visible spectrum, the optical imaging lens 300 satisfies: 0.26>f4/F>0.23, SD>WT1, and 20° C.>WT1>−40° C., wherein F is the focal length of the optical imaging lens 300, and f4 is the focal length of the fourth lens L4;

(8) when the fourth lens L4 of the fourth optical assembly C4 is in the second working temperature WT2 and visible spectrum, the optical imaging lens 300 satisfies: 0.29>f4/F>0.24, WT2>SD, and 105° C.>WT2>30° C., wherein F is the focal length of the optical imaging lens 300, and f4 is the focal length of the fourth lens L4;

(9) when in visible spectrum or infrared spectrum, the fifth optical assembly C5 of the optical imaging lens 300 satisfies: 0.07>f56/F>0.015, wherein F is the focal length of the optical imaging lens 300, and f56 is a focal length of the compound lens formed by adhering the fifth lens L5 and the sixth lens L6.

Parameters of the optical imaging lens 300 of the third embodiment of the present invention are listed in following Table 7 and Table 8, including the focal length F of the optical imaging lens 300 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens in different temperatures, and the focal length (cemented focal length) of the fifth optical assembly C5 in visible spectrum and infrared spectrum, wherein a unit of the focal length, the radius of curvature, and the distance is millimeter (mm).

TABLE 7

F = 1.585 mm; Fno = 2; HFOV = 200 deg

| Surface | R(mm) | D(mm) | Nd | Focal length in First working temperature | Focal length in Standard temperature | Focal length in Second working temperature | Note |
|---|---|---|---|---|---|---|---|
| S1 | 17.94 | 1.98 | 1.89 | −14.19 | −14.23 | −14.27 | L1 |
| S2 | 7.84 | 3.51 | 1 | 0 | 0 | 0 | |
| S3 | 17.78 | 0.8 | 1.84 | −5.98 | −6 | −6.02 | L2 |
| S4 | 3.79 | 3.74 | 1 | 0 | 0 | 0 | |
| S5 | −5.49 | 3.95 | 1.86 | 13.25 | 13.28 | 13.32 | L3 |
| S6 | −4.29 | 2.86 | 1 | 0 | 0 | 0 | |
| ST | Infinity | 1.91 | 1 | 0 | 0 | 0 | ST |
| S7 | 9.82 | 2.71 | 1.5 | 6.61 | 6.63 | 6.65 | L4 |
| S8 | −3.53 | 0.1 | 1 | 0 | 0 | 0 | |
| S9 | 6.81 | 2.77 | 1.6 | 18.2 | 18.25 | 18.31 | L5 |
| S10, S11 | −4.05 | 1.14 | 1.96 | −10.88 | −10.91 | −10.94 | L6 |
| S12 | 422.42 | 0.25 | 1 | 0 | 0 | 0 | |
| S13 | Infinity | 0.8 | 1.52 | 0 | 0 | 0 | Infrared filter L7 |
| S14 | Infinity | 1.48 | 1 | 0 | 0 | 0 | |
| Im | Infinity | | | | | | Image plane Im |

TABLE 8

| Surface | Cemented focal length in visible spectrum | Cemented focal length in infrared spectrum | Note |
|---|---|---|---|
| S 9 | 102.31 | 103.41 | C5 |

It can be seen from Table 7 and Table 8 that, in the current embodiment, the focal length F of the optical imaging lens 300 is 1.585 mm, and the Fno is 2, and the HFOV is 200 degrees, wherein f1=−14.19 mm in the first working temperature WT1; f1=−14.23 mm in the standard temperature SD; f1=−14.27 mm in the second working temperature WT2; f2=−5.98 mm in the first working temperature WT1; f2=−6 mm in the standard temperature SD; f2=−6.02 mm in the second working temperature WT2; f3=13.25 mm in the first working temperature WT1; f3=13.28 mm in the standard temperature SD; f3=13.32 mm in the second working temperature WT2; f4=6.61 mm in the first working temperature WT1; f4=6.63 mm in the standard temperature SD; f4=6.65 mm in the second working temperature WT2; f5 (a focal length of the fifth lens L5)=18.2 mm in the first working temperature WT1; f5=18.25 mm in the standard temperature SD; f5=18.31 mm in the second working temperature WT2; f6 (a focal length of the sixth lens L6)=−10.88 mm in the first working temperature WT1; f6=−10.91 mm in the standard temperature SD; f6=−10.94 mm in the second working temperature WT2; f56=102.31 mm in visible spectrum; f56=103.41 mm in infrared spectrum.

Additionally, based on the above detailed parameters, detailed values of the aforementioned conditional formula in the third embodiment are as follows:

(1) when the first lens L1 of the first optical assembly C1 is in the standard temperature SD and visible spectrum, the optical imaging lens 200 satisfies: f1/F=−0.11;

(2) when the second lens L2 of the second optical assembly C2 is in the standard temperature SD and visible spectrum, the optical imaging lens 200 satisfies: f2/F=−0.26;

(3) when the third lens L3 of the third optical assembly C3 is in the standard temperature SD and visible spectrum, the optical imaging lens 200 satisfies: f3/F=0.12;

(4) when the third lens L3 of the third optical assembly C3 is in the first working temperature WT1 and visible spectrum, the optical imaging lens 200 satisfies: f3/F=0.12;

(5) when the third lens L3 of the third optical assembly C3 is in a second working temperature WT2 and visible spectrum, the optical imaging lens 200 satisfies: f3/F=0.12;

(6) when the fourth lens L4 of the fourth optical assembly C4 is in the standard temperature SD and visible spectrum, the optical imaging lens 200 satisfies: f4/F=0.24;

(7) when the fourth lens L4 of the fourth optical assembly C4 is in the first working temperature WT1 and visible spectrum, the optical imaging lens 100 satisfies: f4/F=0.24;

(8) when the fourth lens L4 of the fourth optical assembly C4 is in the second working temperature WT2 and visible spectrum, the optical imaging lens 100 satisfies: f4/F=0.23;

(9) when in visible spectrum or infrared spectrum, the fifth optical assembly C5 of the optical imaging lens 100 satisfies: f56/F=0.02.

With the aforementioned design, the first optical assembly C1 to the fifth optical assembly C5 satisfy the aforementioned conditions (1) to (9) of the optical imaging lens 300.

Moreover, an aspheric surface contour shape Z of each of the object-side surface S5 of the third lens L3, and the image-side surface S6 of the third lens L3, and the object-side surface S7 of the fourth lens L4, and the image-side surface S8 of the fourth lens L4 of the optical imaging lens 300 according to the third embodiment could be obtained by following formula:

$$Z = \frac{ch^2}{1 + \sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S5 of the third lens L3, and the image-side surface S6 of the third lens L3, and the object-side surface S7 of the fourth lens L4, and the image-side surface S8 of the fourth lens L4 of the optical imaging lens 300 according to the third embodiment and the different order coefficient of A2, A4, A6, A8, A10, A12, A14, and A16 are listed in following Table 9:

TABLE 9

| Surface | S5 | S6 | S7 | S8 |
|---|---|---|---|---|
| k | 9.84E-01 | -4.55E-01 | -9.75E+00 | -4.98E-01 |
| A2 | 0 | 0 | 0 | 0 |
| A4 | 4.47E-04 | 1.10E-03 | 0 | -1.49E-04 |
| A6 | 7.28E-06 | -6.33E-05 | 0 | 2.22E-05 |
| A8 | -4.06E-06 | 2.29E-06 | 0 | -6.23E-06 |
| A10 | 1.64E-07 | -3.78E-08 | 0 | 2.75E-07 |
| A12 | 0 | 0 | 0 | 1.56E-10 |
| A14 | 0 | 0 | 0 | 0 |
| A16 | 0 | 0 | 0 | 0 |

Figure 3B:
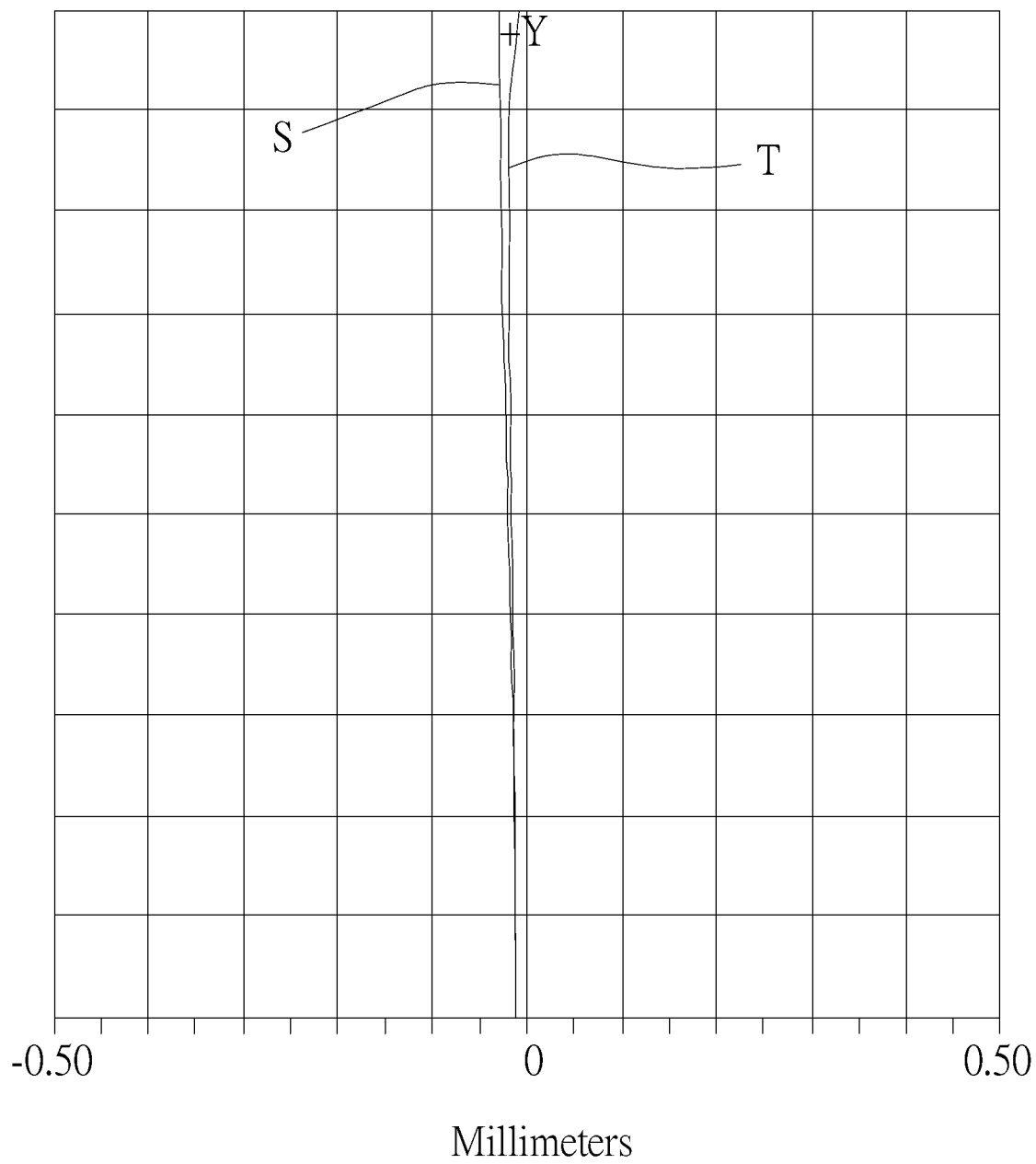
FIG. 3B is a diagram showing the astigmatic field curvature of the optical imaging lens according to the third embodiment of the present invention.
Figure 3C:
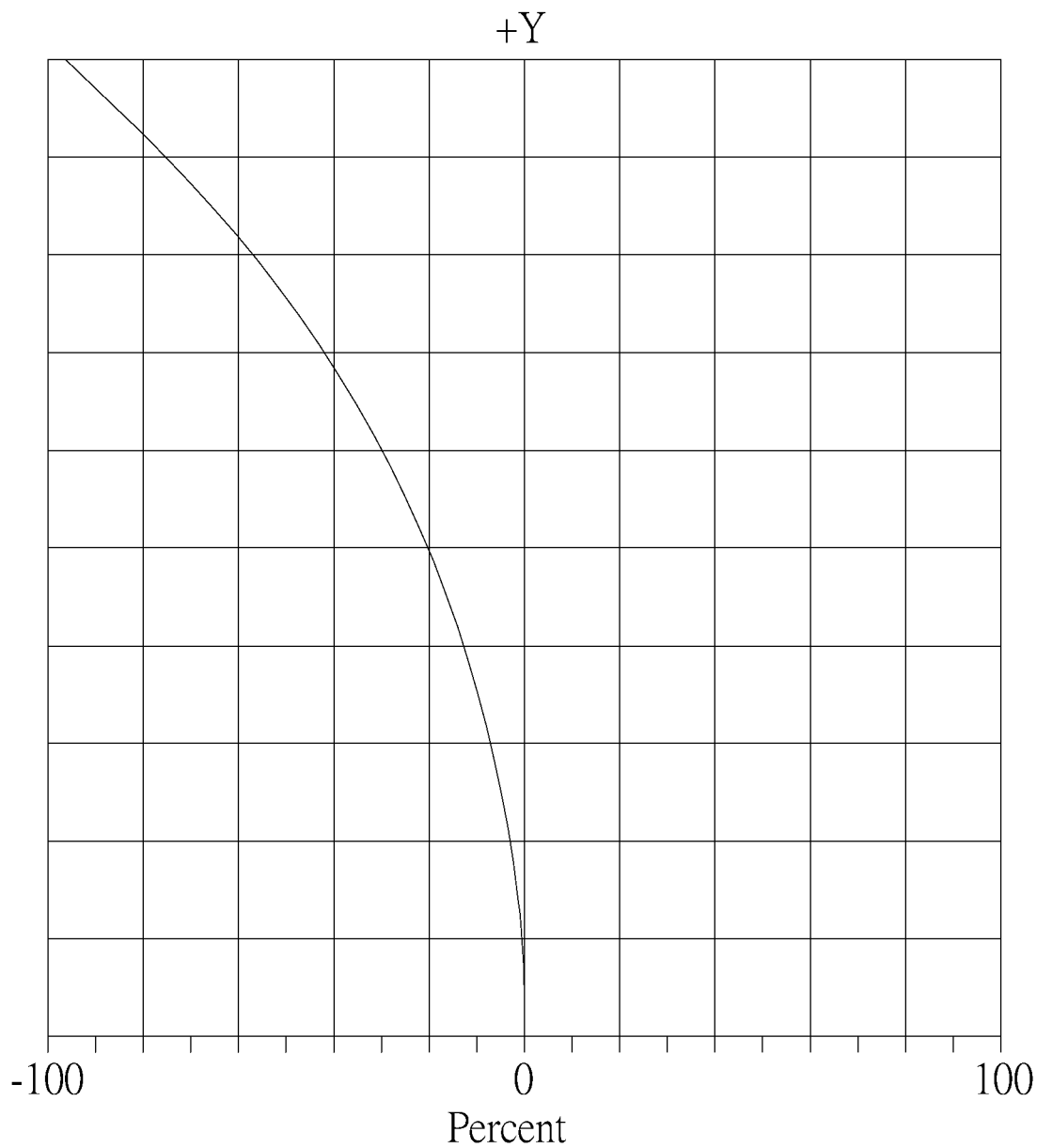
FIG. 3C is a diagram showing the distortion of the optical imaging lens according to the third embodiment of the present invention.
Figure 3D:
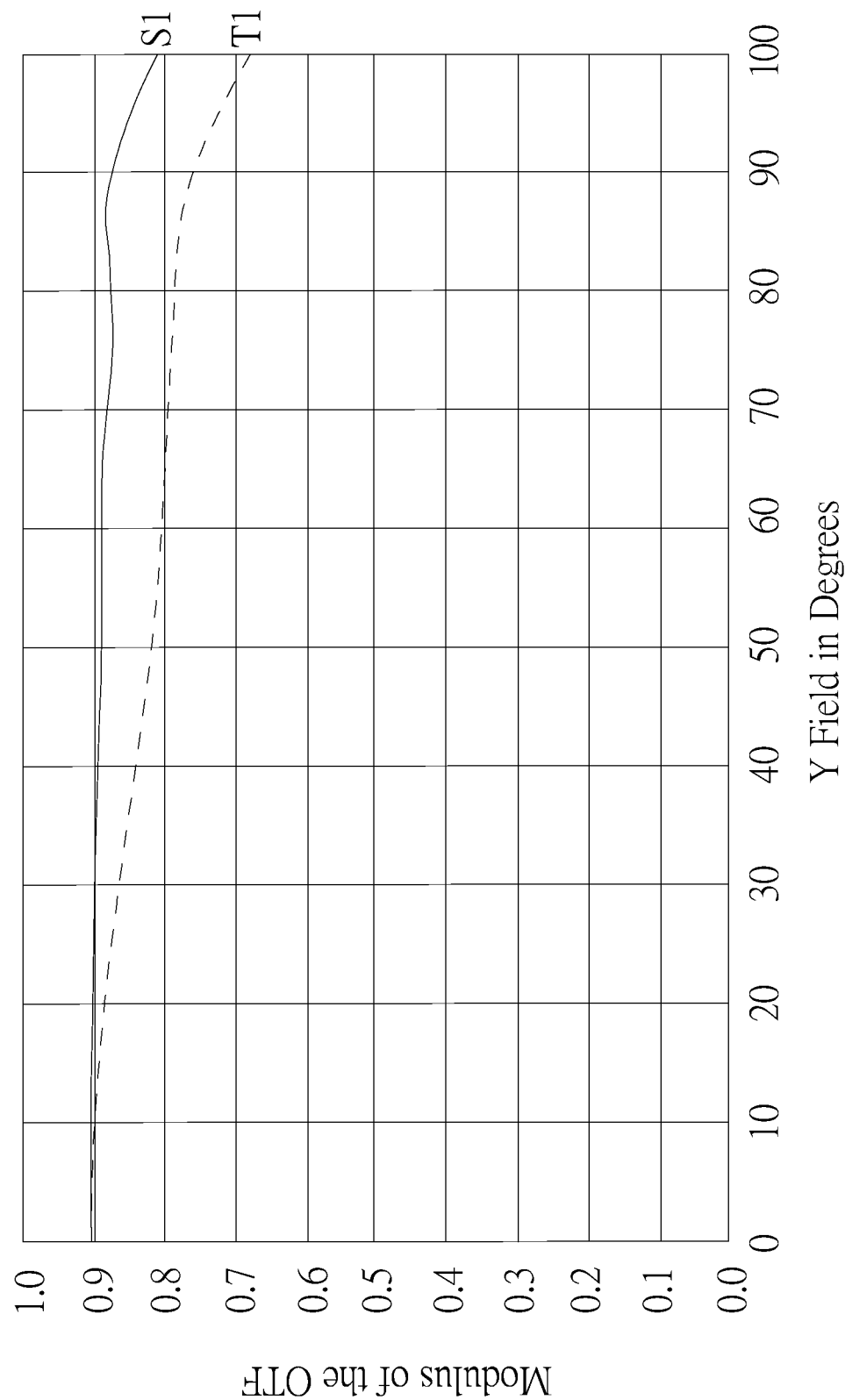
FIG. 3D is a diagram showing the modulus of the OTF of the optical imaging lens according to the third embodiment of the present invention.

Taking optical simulation data to verify the imaging quality of the optical imaging lens 300, wherein FIG. 3B is a diagram showing the astigmatic field curves according to the third embodiment; FIG. 3C is a diagram showing the distortion according to the third embodiment; FIG. 3D is a diagram showing the modulus of the OTF according to the third embodiment. In FIG. 3B, a curve S is data of a sagittal direction, and a curve T is data of a tangential direction. The graphics shown in FIG. 3C and FIG. 3D are within a standard range. In this way, the optical imaging lens 300 of the third embodiment could effectively enhance image quality and lower a distortion thereof.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:
1. An optical imaging lens, in order from an object side to an image side along an optical axis, comprising:
   a first optical assembly having negative refractive power;
   a second optical assembly having negative refractive power;
   a third optical assembly having positive refractive power;
   an aperture;
   a fourth optical assembly having positive refractive power;
   a fifth optical assembly having positive refractive power;
   wherein one of the first optical assembly, the second optical assembly, the third optical assembly, the fourth optical assembly, and the fifth optical assembly comprise a compound lens formed by adhering at least two lenses, while the others are single lens;
   wherein the optical imaging lens satisfies: $0.07 > f56/F > 0.015$ in both visible spectrum and infrared spectrum; F is a focal length of the optical imaging lens, and f56 is a focal length of the fifth optical assembly; a wavelength of the visible spectrum ranges between 400 nm and 650 nm, and a wavelength of the infrared spectrum ranges between 760 nm and 1 mm.
2. The optical imaging lens as claimed in claim 1, wherein the first optical assembly is a single lens that comprises a first lens; the second optical assembly is a single lens that comprises a second lens; the third optical assembly is a single lens that comprises a third lens; the fourth optical assembly is a single lens that comprises a fourth lens; the fifth optical assembly is a compound lens that comprises a fifth lens and a sixth lens.
3. The optical imaging lens as claimed in claim 2, wherein the optical imaging lens satisfies: $-0.1 > f1/F > -0.2$ and $30°$ C.$> SD > 20°$ C. when the first optical assembly is in a standard temperature and the visible spectrum, wherein F is the focal length of the optical imaging lens; f1 is a focal length of the first lens; SD is the standard temperature.
4. The optical imaging lens as claimed in claim 2, wherein the optical imaging lens satisfies: $-0.2 > f2/F > -0.4$ and $30°$ C.$> SD > 20°$ C. when the second optical assembly is in a standard temperature and the visible spectrum, wherein F is the focal length of the optical imaging lens; f2 is a focal length of the second lens; SD is the standard temperature.
5. The optical imaging lens as claimed in claim 2, wherein the optical imaging lens satisfies: $0.16 > f3/F > 0.1$ and $30°$ C.$> SD > 20°$ C. when the third optical assembly is in a standard temperature and the visible spectrum, wherein F is the focal length of the optical imaging lens; f3 is a focal length of the third lens; SD is the standard temperature.
6. The optical imaging lens as claimed in claim 2, wherein the optical imaging lens satisfies: $0.16 > f3/F > 0.1$ and $20°$ C.$> WT1 > -40°$ C. when the third optical assembly is in a first working temperature and the visible spectrum, wherein F is the focal length of the optical imaging lens; f3 is a focal length of the third lens; WT1 is the first working temperature.
7. The optical imaging lens as claimed in claim 2, wherein the optical imaging lens satisfies: $0.18 > f3/F > 0.1$ and $105°$ C.$> WT2 > 30°$ C. when the third optical assembly is in a second working temperature and the visible spectrum, wherein F is the focal length of the optical imaging lens; f3 is a focal length of the third lens; WT2 is the second working temperature.
8. The optical imaging lens as claimed in claim 2, wherein the optical imaging lens satisfies: $0.26 > f4/F > 0.23$ and $30°$ C.$> SD > 20°$ C. when the fourth optical assembly is in a standard temperature and the visible spectrum, wherein F is the focal length of the optical imaging lens; f4 is a focal length of the fourth lens; SD is the standard temperature.
9. The optical imaging lens as claimed in claim 2, wherein the optical imaging lens satisfies: $0.26 > f4/F > 0.23$ and $20°$ C.$> WT1 > -40°$ C. when the fourth optical assembly is in a first working temperature and the visible spectrum, wherein F is the focal length of the optical imaging lens; f4 is a focal length of the fourth lens; WT1 is the first working temperature.
10. The optical imaging lens as claimed in claim 2, wherein the optical imaging lens satisfies: $0.29 > f4/F > 0.24$ and $105°$ C.$> WT2 > 30°$ C. when the fourth optical assembly is in a second working temperature and the visible spectrum, wherein F is the focal length of the optical imaging lens; f4 is a focal length of the fourth lens; WT2 is the second working temperature.
11. An optical imaging lens, in order from an object side to an image side along an optical axis, comprising:
   a first lens having negative refractive power, wherein an object-side surface of the first lens is a convex surface, and an image-side surface of the first lens is a concave surface;
   a second lens having negative refractive power, wherein an object-side surface of the second lens is a convex surface, and an image-side surface of the second lens is a concave surface;
   a third lens having positive refractive power, wherein an object-side surface of the third lens is a concave surface, and an image-side surface of the third lens is a convex surface; the object-side surface of the third lens and/or the image-side surface of the third lens are/is an aspheric surface;

an aperture;

a fourth lens, which is a biconvex lens with positive refractive power, wherein an object-side surface of the fourth lens and/or an image-side surface of the fourth lens are/is an aspheric surface;

a fifth lens, which is a biconvex lens with positive refractive power;

a sixth lens having negative refractive power, wherein an object-side surface of the sixth lens is a concave surface; the object-side surface of the sixth lens and an image-side surface of the fifth lens are adhered to form a compound lens with positive refractive power; and wherein the optical imaging lens satisfies: $0.07 > f56/F > 0.015$ in both visible spectrum and infrared spectrum; F is a focal length of the optical imaging lens, and f56 is a focal length of the fifth optical assembly; a wavelength of the visible spectrum ranges between 400 nm and 650 nm, and a wavelength of the infrared spectrum ranges between 760 nm and 1 mm.

12. The optical imaging lens as claimed in claim 11, wherein both of the object-side surface of the third lens and the image-side surface of the third lens are aspheric surfaces.

13. The optical imaging lens as claimed in claim 11, wherein both of the object-side surface and the image-side surface of the fourth lens are aspheric surfaces.

14. The optical imaging lens as claimed in claim 11, wherein the optical imaging lens satisfies: $-0.1 > f1/F > -0.2$ and $30°C. > SD > 20°C.$ when the first lens is in a standard temperature and the visible spectrum, wherein F is the focal length of the optical imaging lens; f1 is a focal length of the first lens; SD is the standard temperature.

15. The optical imaging lens as claimed in claim 11, wherein the optical imaging lens satisfies: $-0.2 > f2/F > -0.4$ and $30°C. > SD > 20°C.$ when the second lens is in a standard temperature and the visible spectrum, wherein F is the focal length of the optical imaging lens; f2 is a focal length of the second lens; SD is the standard temperature.

16. The optical imaging lens as claimed in claim 11, wherein the optical imaging lens satisfies: $0.16 > f3/F > 0.1$ and $30°C. > SD > 20°C.$ when the third lens is in a standard temperature and the visible spectrum, wherein F is the focal length of the optical imaging lens; f3 is a focal length of the third lens; SD is the standard temperature.

17. The optical imaging lens as claimed in claim 11, wherein the optical imaging lens satisfies: $0.16 > f3/F > 0.1$ and $20°C. > WT1 > -40°C.$ when the third lens is in a first working temperature and the visible spectrum, wherein F is the focal length of the optical imaging lens; f3 is a focal length of the third lens; WT1 is the first working temperature.

18. The optical imaging lens as claimed in claim 11, wherein the optical imaging lens satisfies: $0.18 > f3/F > 0.1$ and $105°C. > WT2 > 30°C.$ when the third lens is in a second working temperature and the visible spectrum, wherein F is the focal length of the optical imaging lens; f3 is a focal length of the third lens; WT2 is the second working temperature.

19. The optical imaging lens as claimed in claim 11, wherein the optical imaging lens satisfies: $0.26 > f4/F > 0.23$ and $30°C. > SD > 20°C.$ when the fourth lens is in a standard temperature and the visible spectrum, wherein F is the focal length of the optical imaging lens; f4 is a focal length of the fourth lens; SD is the standard temperature.

20. The optical imaging lens as claimed in claim 11, wherein the optical imaging lens satisfies: $0.26 > f4/F > 0.23$ and $20°C. > WT1 > -40°C.$ when the fourth lens is in a first working temperature and the visible spectrum, wherein F is the focal length of the optical imaging lens; f4 is a focal length of the fourth lens; WT1 is the first working temperature.

21. The optical imaging lens as claimed in claim 11, wherein the optical imaging lens satisfies: $0.29 > f4/F > 0.24$ and $105°C. > WT2 > 30°C.$ when the fourth lens is in a second working temperature and the visible spectrum, wherein F is the focal length of the optical imaging lens; f4 is a focal length of the fourth lens; WT2 is the second working temperature.

* * * * *